(No Model.) 10 Sheets—Sheet 2.

W. FOGLESONG.
MACHINE FOR MAKING PAPER VESSELS.

No. 519,153. Patented May 1, 1894.

Witnesses
G. A. Tauberschmidt,
J. D. Kingsbury

Inventor
Washington Foglesong
By his Attorneys
Whitaker & Prevost (No Model.) 10 Sheets—Sheet 3.

W. FOGLESONG.
MACHINE FOR MAKING PAPER VESSELS.

No. 519,153. Patented May 1, 1894.

Witnesses
Inventor
Washington Foglesong
By his Attorneys
Whitaker & Prevost (No Model.) 10 Sheets—Sheet 4.
W. FOGLESONG.
MACHINE FOR MAKING PAPER VESSELS.
No. 519,153. Patented May 1, 1894.

Witnesses: G. A. Tauberschmidt, J. D. Kingsbery

Inventor: Washington Foglesong
By his Attorneys Whitaker & Prevost (No Model.) 10 Sheets—Sheet 5.
W. FOGLESONG.
MACHINE FOR MAKING PAPER VESSELS.
No. 519,153. Patented May 1, 1894.

Witnesses
G. A. Tauberschmidt
J. D. Kingsbury

Inventor
Washington Foglesong
By his Attorneys
Whitaker & Prevost (No Model.) 10 Sheets—Sheet 7.
W. FOGLESONG.
MACHINE FOR MAKING PAPER VESSELS.

No. 519,153. Patented May 1, 1894.

Witnesses: G. A. Tauberschmidt, J. D. Kingsbury

Inventor: Washington Foglesong
By his Attorneys Whitaker & Prevost

(No Model.) 10 Sheets—Sheet 9.

W. FOGLESONG.
MACHINE FOR MAKING PAPER VESSELS.

No. 519,153. Patented May 1, 1894.

Witnesses
Inventor
Washington Foglesong
By his Attorneys
Whitaker & Prevost

THE NATIONAL LITHOGRAPHING COMPANY,
WASHINGTON, D. C.

(No Model.) 10 Sheets—Sheet 10.

W. FOGLESONG.
MACHINE FOR MAKING PAPER VESSELS.

No. 519,153. Patented May 1, 1894.

Witnesses
G. A. Tauberschmidt
J. D. Kingsbury

Inventor
Washington Foglesong
By his Attorneys
Whitaker & Prevost

UNITED STATES PATENT OFFICE.

WASHINGTON FOGLESONG, OF DAYTON, OHIO, ASSIGNOR TO THE BAKER & FOGLESONG MANUFACTURING COMPANY, OF SAME PLACE.

MACHINE FOR MAKING PAPER VESSELS.

SPECIFICATION forming part of Letters Patent No. 519,153, dated May 1, 1894.

Application filed January 26, 1891. Serial No. 379,148. (No model.)

*To all whom it may concern:*

Be it known that I, WASHINGTON FOGLESONG, a citizen of the United States, residing at Dayton, in the county of Montgomery and State of Ohio, have invented certain new and useful Improvements in Machines for Making Paper Vessels; and I do hereby declare the following to be a full, clear, and exact description of the invention, such as will enable others skilled in the art to which it appertains to make and use the same.

My invention relates to the manufacture of paper vessels and consists in the improved machine for forming said vessels and for forming and applying the bails for the same.

In the accompanying drawings I have illustrated the best form in which I have contemplated embodying my invention and the said invention is fully disclosed in the following description and claims.

Referring to the said drawings Figs. 9, 10 and 11 are enlarged detail views of the plunger and connected devices. Fig. 11$^a$ is a detail section of part of the mechanism. Fig. 12 is a detail of part of the mechanism. Fig. 16 is a detail of the cams and lever connections for operating a portion of the bail forming devices. Fig. 17 is a detail of the plunger operating cam. Figs. 18, 18$^a$ and 18$^b$ are details showing the clutching lever, used in connection with the wire feeding devices.

Figure 2:
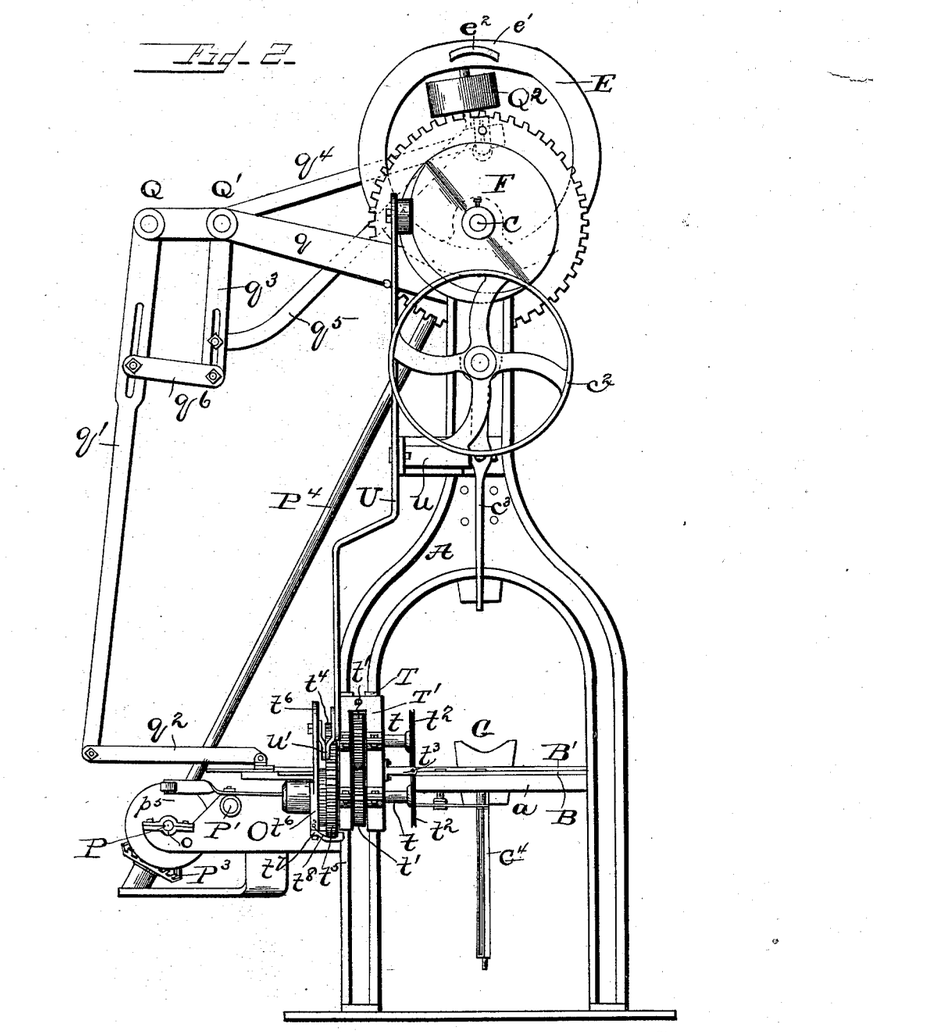
Fig. 2 is a right side elevation of the same.

Referring to the drawings and the reference letters thereon, A A represent two vertical standards of the main frame of the machine, which are preferably given the form shown in Fig. 2. The standards A A are united by the cross brace A' and by a rectangular bed frame $a$, $a$, which supports the bed plates of the machine. Upon the bed frame $a$, $a$ rest the lower plate B and upper plate B' which are bolted together and secured to the frame $a$, $a$.

The upper extremities of standards A A are provided with bearings in which a shaft C is mounted and upon this shaft are adjustably secured the cams D, E and F and the gear wheel $c$. The driving shaft C' of the machine is shown in this instance as mounted in bearings bracketed to one of the standards, A, and is provided with a driving pinion $c'$ and main pulley $c^2$ by means of which power is applied to the machine from any suitable source. A clutch C$^2$ is preferably interposed between the driving pulley and the driving shaft as shown and an operating lever $c^3$ is provided for operating said clutch. It is obvious however that I might employ fast and loose pulleys and a belt shipper to ship the driving belt from one to another if desired.

In using this machine I may operate upon the paper vessels formed by the machine disclosed in my former Letters Patent of the United States, No. 432,028, dated July 15, 1890, in which case the function of my present machine will be to apply the bails to such vessels, or I may use my present machine to form the vessels from a blank and attach the bails thereto, or I may employ it to form the vessels from a blank previously creased or indented to facilitate the folding operation. In any of these instances the means for holding the vessel will hold the same without the aid or manipulation of the operator while the co-operating mechanism attaches the bail to the opposite ends or sides of the vessel, and the operation of the bail forming and attaching devices will be the same in each case. I have illustrated and shall describe my present invention as constructed to form paper vessels of the character disclosed in my former Patent No. 411,654, dated September 24, 1890, but it is obvious that by slightly modifying the shape and form of parts of the mechanism other forms of vessels and vessels of different sizes can be manufactured by the use of my invention.

Figure 28:
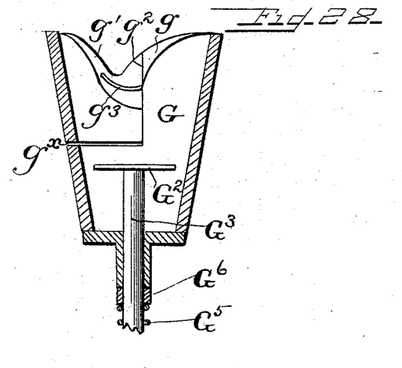
Figs. 28 and 29 are details of the female die or former.
Figure 29:
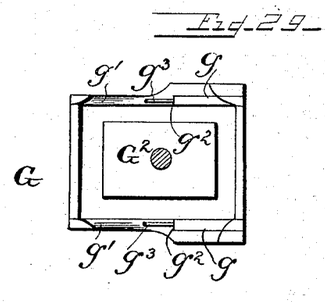
Figure 30:
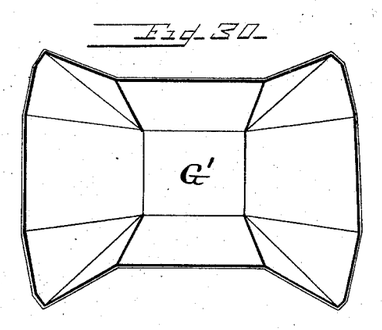
Figs. 30, 31 and 32 are views of the paper vessel at different stages of its manufacture.
Figure 31:
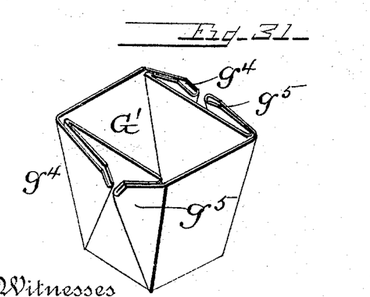
Figure 32:
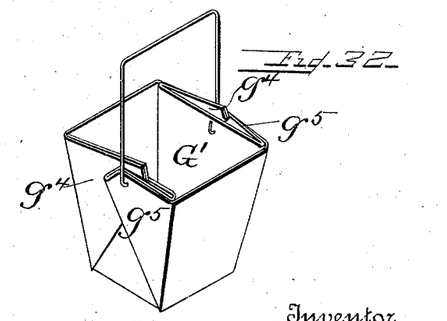

The bed plates B B' are provided with a central aperture in which is secured the female die G which is in this instance of tapering form from top to base as shown in Figs. 28 and 29 and is constructed to conform interiorly exactly to the size and shape of the vessel to be manufactured. Two opposite sides of the upper edge of this female die are provided with the inclined beveled portions $g$ and $g'$ the portions $g$ having their lower edges at a point above the lower edges of portions $g'$. This construction forms a shoulder having a perpendicular face $g^2$ between the beveled portions $g\ g'$ at their point of meeting as shown in Fig. 29. An upwardly curved guide $g^3$ preferably of stiff wire extends out from this perpendicular face $g^2$ as clearly shown in the drawings. When the blank G' shown in Fig. 30 is pressed into the female die G the side folds $g^4\ g^5$ will be formed as shown in Figs. 31 and 32 and one of said folds will engage the inclined beveled portion $g$ of the die while the other engages the portion $g'$. The inclined portion $g$ will press the side fold which it engages inwardly before the other fold is pressed in by the portion $g'$ hence the two folds engaging the portions $g$ will always be pressed in first and the others will be neatly folded upon them as shown in Fig. 32. The curved guides $g^3$ extending from the face $g^2$ will pass between the side flaps as the blank descends into the die and holds the outer folds out of the way while the inner folds are being pressed inward. The die G is also provided with a false bottom $G^2$ secured to a rod $G^3$ extending downward beneath the machine, and engaging a bearing in the bottom of the die and in a bracket $G^4$ extending downward from said die and secured thereto. A retraction spring $G^5$ is interposed between the end of this bracket and a fixed collar $G^6$ on said rod $G^3$ for raising the false bottom $G^2$ and partially expelling the completed vessel. The die G is also provided with a slot $g^\times$ extending entirely through one face and substantially the middle of the two adjoining faces, as clearly shown in Fig. 28, for the admission of the bail.

Figures 16, 17, 18, 18A, 18B:
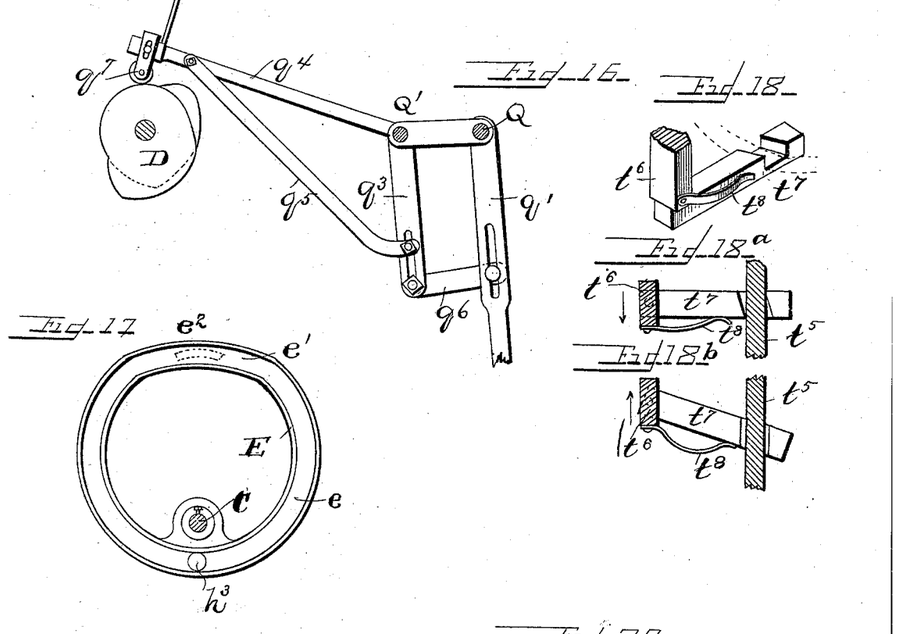

Above the female die G and exactly in line with the same is located the male die H adjustably secured to the vertically reciprocating plunger $h$, see Figs. 1, 2, 9, 10 and 11. The plunger is formed preferably of a flat bar having a forwardly extending rib $h^\times$ or web on its front face as shown in the drawings and said plunger is mounted in guides $h'$ on the cross bar A' and slides freely therein. The upper end of the plunger is cut away for a portion of its length leaving a narrow portion $h^2$ which is provided with a friction roll $h^3$ engaging a groove $e$ in the cam E mounted on the shaft C by means of which the plunger and die are reciprocated. At one side of the web or rib $h^\times$ is secured the sliding bar H' which is movably secured to said rib by means of bolts passing through slots in said bar, thus permitting a longitudinal reciprocation of said bar. The upper end of the bar H' extends into the path of a cam $e^2$ on the rear face of the grooved cam E and the bar is thereby depressed when this portion $e'$ of the cam E is in its lowest position, which occurs when the plunger is depressed and the male die has been forced with the blank into the female die. The cam E is given a concentric portion or rest $e'$ at this point as shown in Fig. 17, to maintain the plunger and die in their lowest position without movement while the bail is applied to the vessel upon said plunger. In order to prevent jarring as the cam revolves and raises or depresses the plunger, I provide the shaft C with a counter balance weight E' extending on the side opposite to the heavier portion of the cam, which renders the movements of the cam even and uniform. The lower end of the bar H' is secured to a sliding collar $h^4$. A pair of bell crank levers, $h^5$ are pivoted to a part secured to the web or rib of the plunger as shown at $h^6$ and have their lower extremities extending downward below the top face of the die H where they engage slots $h^7$. At the point $h^8$ where the two portions of the bell crank unite, the said levers are connected by adjustable links $h^9$ with the sliding sleeve $h^4$ so that when the bar H' is depressed by its cam $e^2$ the bell crank levers will be operated and their lower ends moved laterally, as will be clearly seen in Fig. 10, the slots in the die H permitting such movement.

Figures 10, 11, 11A, 12:
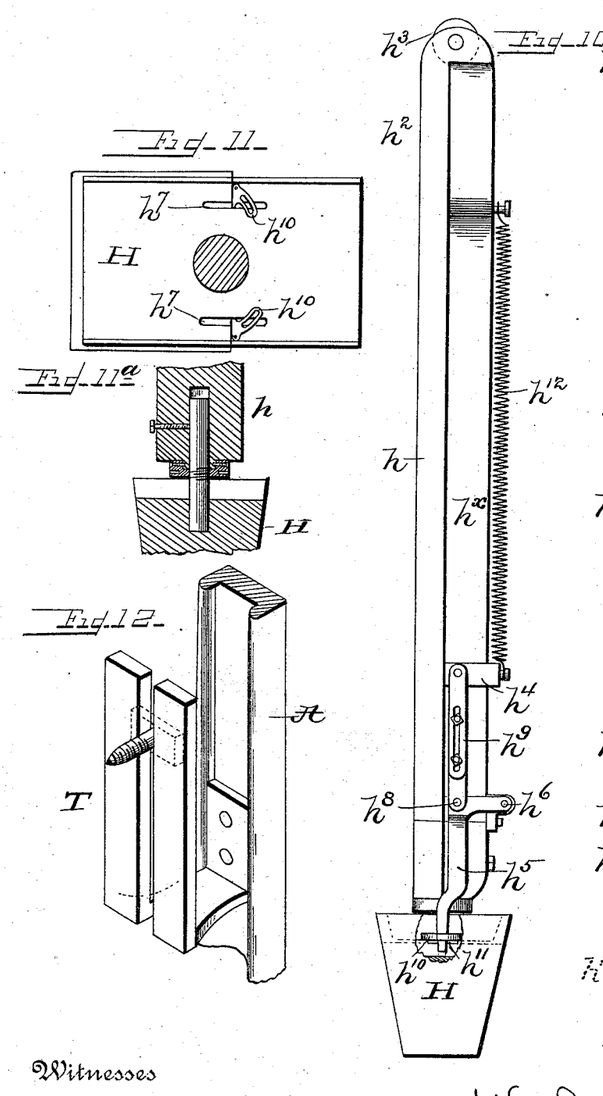

The top face of the die H is below the top edges of its sides or faces as indicated in Fig. 10 and upon this upper face are pivoted two levers $h^{10}\ h^{10}$ which I term the clinching levers. These clinching levers are provided with slotted portions which are engaged by the lower ends of the bell cranks, and also with straight faces, for engaging the ends of the bails when punched or forced through the sides of the vessel, and bending and clinching the same as clearly shown in Figs. 5, 6, 7 and 11. The links $h^9$ are adjustable by means of slots and adjusting bolts and by means of this construction the exact and proper movement of the clinching levers can be readily secured. The side walls of the die H are provided adjacent to the clinching levers with the slots $h^{11}$ through which the bent ends of the bail are pressed and which permit the proper clinching of the said ends by the levers $h^{10}\ h^{10}$. A spring $h^{12}$ is connected to the sleeve $h^4$ or other part of the devices for operating the clinching levers, and to a part of the plunger and serves to retract the bar H' and levers $h^5$ after they have been operated by the cam $e^2$.

Figure 5:
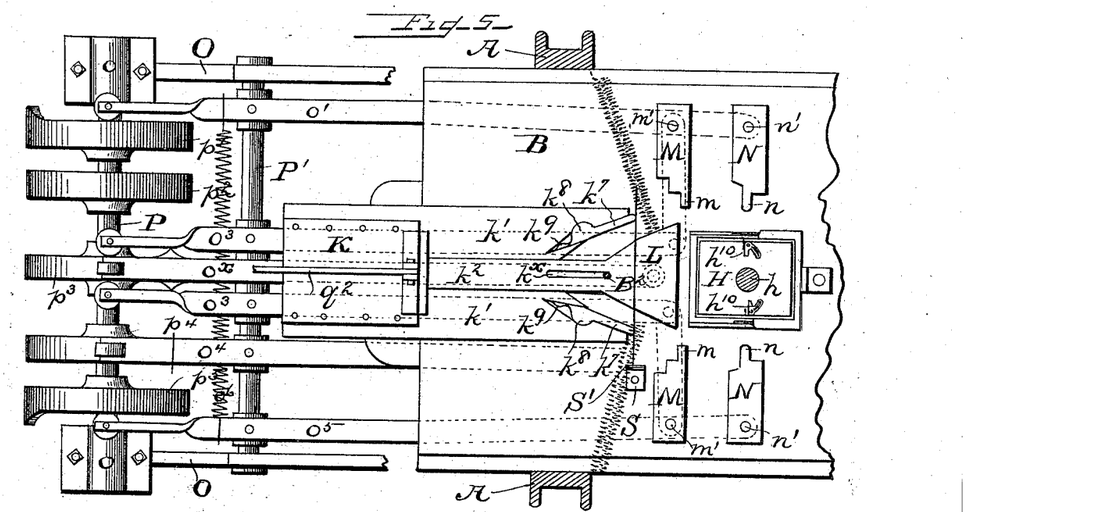
Figs. 5, 6 and 7 are views of the bail forming mechanism illustrating the formation and application of the bail to the vessel.
Figure 6:
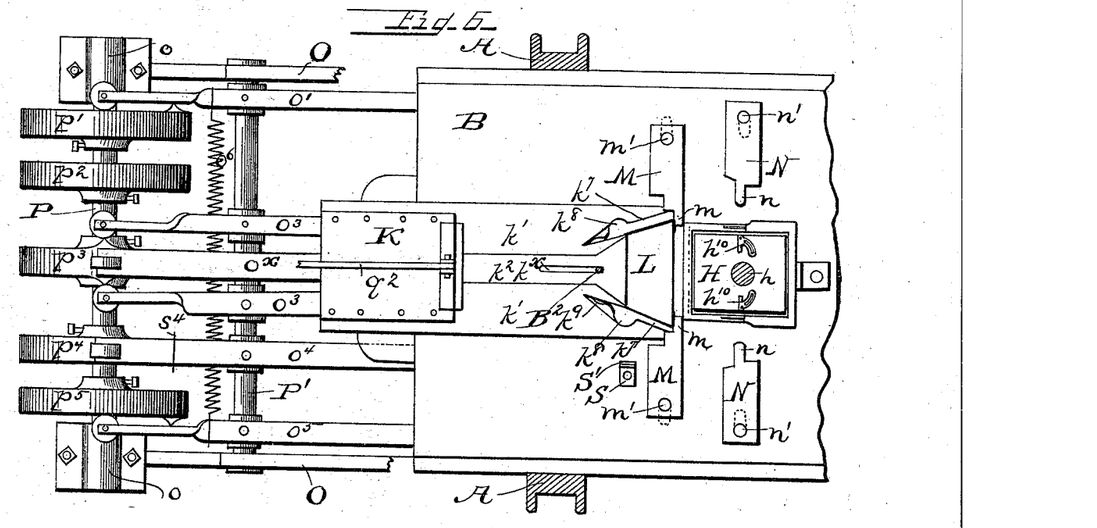
Figure 7:
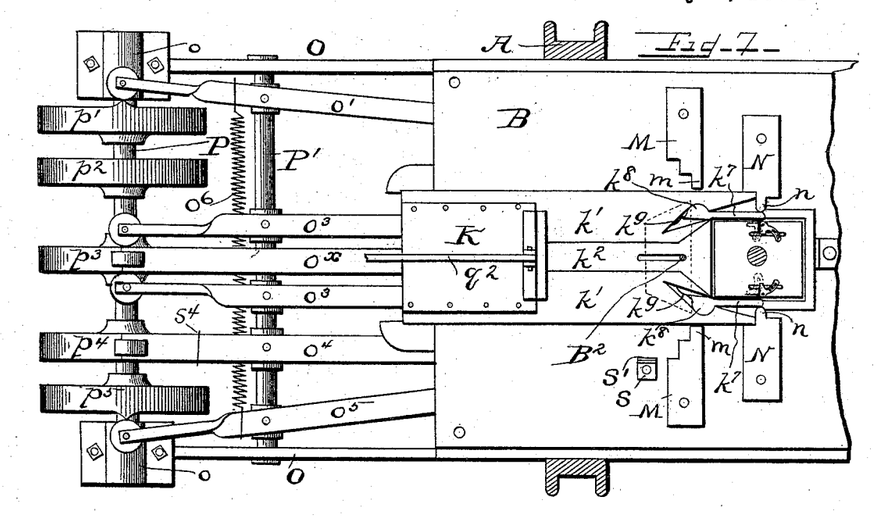
Figure 8:
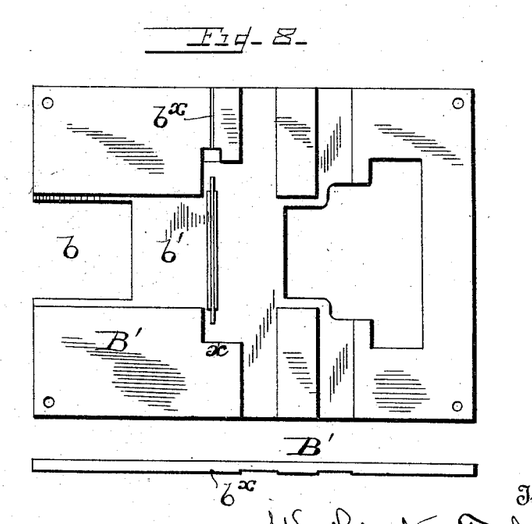
Fig. 8 represents a bottom view and edge view of the top plate of the machine.
Figure 9:
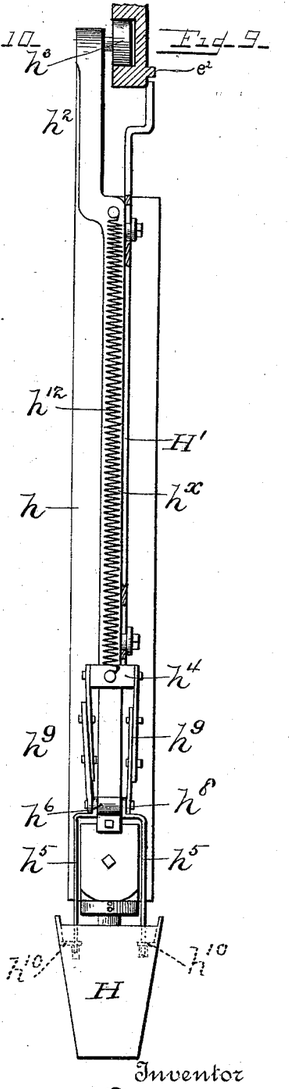

The devices for forming a piece of wire which is fed into the machine by devices hereinafter described, into a bail, and for applying the bail when formed to the vessel, which at the time of application is held between the male and female dies H and G, lie mainly between the upper and lower plates B B' of the machine, and I prefer to arrange the said devices upon the surface of the lower plate and to provide the upper plate with recesses to accommodate the said parts and permit their movements, as indicated in the drawings. In Figs. 5, 6 and 7 I have shown the top plate removed from engagement with the bottom plate and the wire manipulating parts, and in Fig. 8 I have shown an under side and an edge view of the upper plate showing the recesses formed therein.

Figure 4:
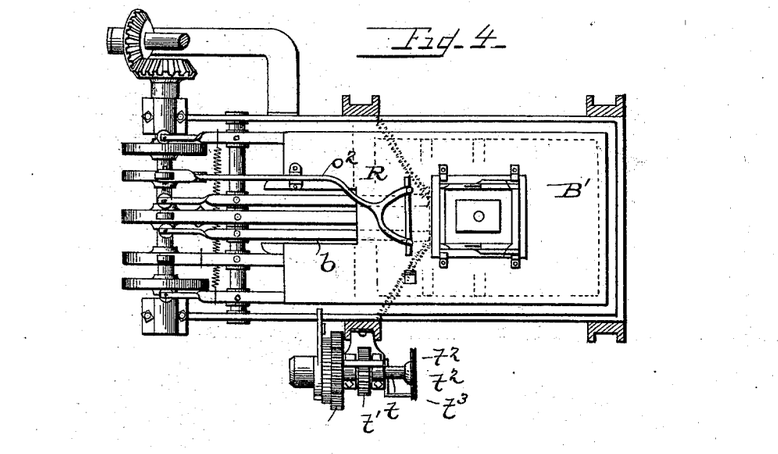
Fig. 4 is a top plan of the bed plate of the machine the upper parts being removed.
Figure 22:
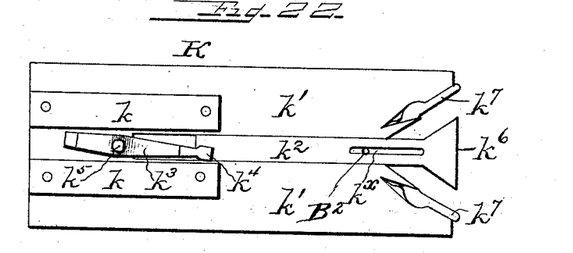
Figs. 22, 23 and 24 are details of a portion of the bail forming devices.
Figure 23:
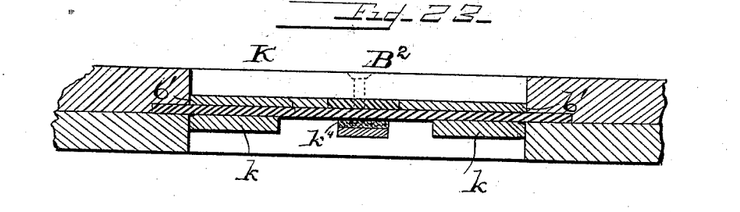
Figure 24:
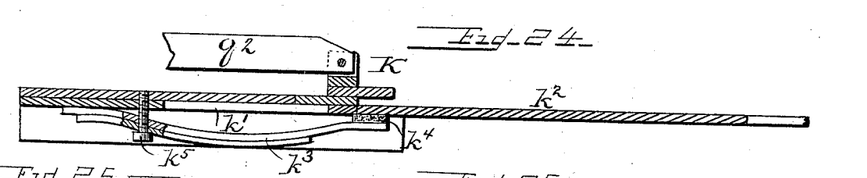

The upper and lower plates B B' extend forward beyond the supporting standards A A and are provided with rectangular cut away portions $b$ see Fig. 4. A slide K which I term the bail former, is arranged to slide on the lower plate and lies in a recess $b'$ in the upper plate, and this slide is provided with guides $k$ on its under side which engage the edges of the cut away portion $b$ of the said plate and guide the slide in its longitudinal movements. The inner end of this slide is divided into two side portions $k'$ $k'$ and a central tongue $k^2$ which is movable to a limited extent with respect to the other portions of said slide. The tongue $k^2$ occupies a recess between said side portions $k'$ $k'$ which is of somewhat greater length than the tongue and the tongue is thus permitted to move inward a certain distance when required. In Fig. 22, I have shown a bottom view of the slide K and in Figs. 23 and 24 are shown details illustrating the construction and arrangement of its parts. I provide a tension device which acts upon said tongue to give it a considerable amount of resistance as it is forced backward into the slide proper; which consists of a spring plate $k^3$ having a friction cushion $k^4$ of leather, rubber or other preferred material engaging the tongue $k^2$ and the amount of frictional resistance desired can be accurately secured by means of the adjusting screw $k^5$ by means of which the pressure of the spring can be regulated. The end of the tongue $k^2$ which extends beyond the side portions of the slide is provided with a head of greater width than the tongue, having a face $k^6$ disposed at right angles to the length of said tongue, which engages the wire from which the bail is formed and clamps it against the front edge of the movable forming block L as shown in Fig. 5, when the slide is moved forward. The tongue $k^2$ is provided with a slot $k^x$ and a pin B$^2$ extends downward through the plate B' and engages said slot. By this means as the slide K is drawn forward after forming and applying the bail, the tongue will be drawn with it by reason of its tension device until the end of the slot $k^x$ engages the pin B$^2$ when the tongue will be stopped and the slide will move on thus drawing out the tongue to its original position in advance of the other portions of the slide. The outer ends of the side pieces $k'$ $k'$ of the slide are formed so as to fit the head of tongue $k^2$, as shown in Fig. 6 when the tongue and slide are moved with respect to each other so as to bring said parts together, and these side pieces are also provided with the laterally movable arms $k^7$, which have their inner faces so arranged as to engage the wire bail, and hold it against the sides of the forming block, as indicated in Fig. 6. The arms $k^7$ have segmental portions $k^8$ which engage similar recesses in the side pieces $k'$ and permit a lateral movement of the free ends of said arms. The inner ends of said arms are also provided with retraction springs $k^9$ which hold the arms normally in their outermost positions. The springs $k^9$ preferably engage the edges of recessed portions of the side pieces and nibs or projections on the arms as shown.

The forming block is made of such size and shape that the wire when bent around its front face and sides will be in proper position to be pressed rearward and into the slot $g^x$ of the female die, with its ends in position to be forced into the paper vessel. This forming block is held up against the top plate, and in position to permit the wire to be bent around it by a spring $l$ and the bottom plate is recessed beneath said block so that the latter may be moved down until it is flush with the top of the said plate when desired.

At either side of the forming block are the auxiliary slides which I term the hook bending slides M, which are moved inward after the wire has been bent around three sides of the forming block L and by means of a projecting portion $m$, bend the rearwardly extending portions of the wire at substantially right angles thus forming the bail hooks, as shown in Fig. 6. These slides are connected by standards $m'$ with operating mechanism below the plate B, the said standards passing through slots in the plate which allow the reciprocatory movement of the slides.

In rear of the bending slides M are located the slides N which when the bail has been moved into position to be applied to the vessel held in the dies, move inward and force the hooks or inwardly bent portions of the bail through the sides of the vessel as shown in Fig. 7, and these slides I term the punching slides. The slides N are provided with projecting portions $n$ and are also provided with standards $n'$ extending downward through slots in plate B, and connected with the operating mechanism, which will be presently described. The projections $n$ $n$ of the slides when the slides N are operated strike the outer ends of the laterally movable arms $k^7$ and thus force the arms of the bail to close upon the paper vessel and press the inwardly extending points of the bail through the sides of the vessel. These arms $k^7$ and the head of the tongue $k^2$ pass through the slot $g^x$ in the female die when the bail is pressed forward into position to be applied to the paper vessel and said arms $k^7$, form the resistance against which the bail is pressed when the levers $h^{10}$ engage the bent end of the bail and clinch or bend it into a position parallel with the arm of the bail, as is clearly shown in Fig. 7.

Figure 13:
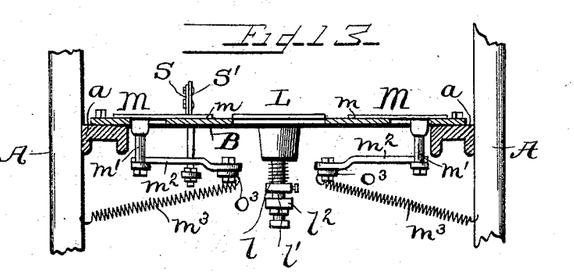
Figs. 13, 14 and 15 are sections through the platen of the machine, showing the cam levers and their connections.
Figure 14:
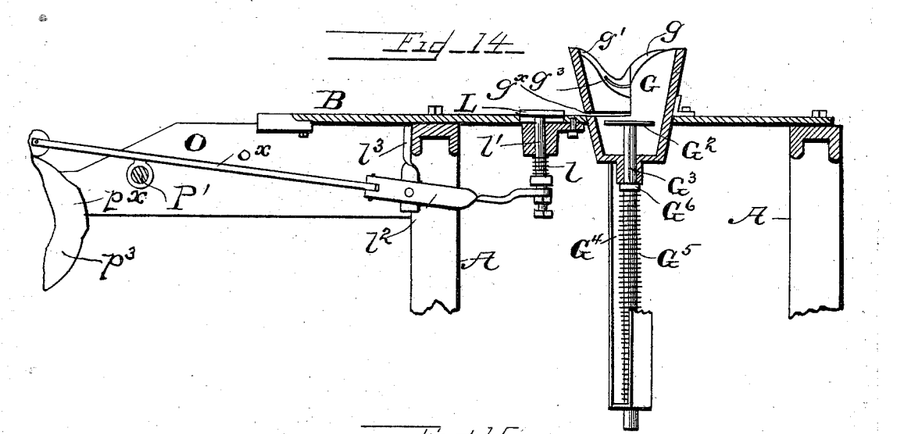

At each side of the machine an arm or support O extends forward, which is provided at its outer end with a journal box $o$. In these bearings is mounted a shaft P upon which a series of cam disks $p'$ $p^2$ $p^3$ $p^4$ and $p^5$ are adjustably secured by means of set screws. These cam disks are provided with cams which are adapted to engage and operate a series of levers fulcrumed on collars mounted on a fulcrum shaft P' secured by set screws in the arms O, O. The levers $o'$ and $o^5$ extend from the cam disks $p'$ and $p^5$ respectively, to the standards $n'$ $n'$ of the punching slides N N and the forward ends of said levers are provided with friction rolls adapted to be engaged by the cams on said cam disks and operate the slides N N at the proper time. A retraction spring or springs draw the levers and slides back into their normal positions after said parts are operated by the cams. In this instance I have shown the levers $o'$ $o^5$ connected forward of their fulcrums by a spring $o^6$. The levers $o^3$ $o^3$ extend from the cam disk $p^3$ to near the center of the plate B, where they are connected by links $m^2$ with the standards $m'$ of the bending slides M (see Fig. 13). The cam disk $p^3$ is provided with cams on its side faces, which engage friction rolls on said levers $o^3$ $o^3$ and operate the same and the slides M M. Retraction springs $m^3$ $m^3$ hold the levers $o^3$ $o^3$ and slides M M in their normal positions. The disk $p^3$ is also provided with a peripheral cam $p^x$ which engages a friction roll on a lever $o^x$ as shown in Fig. 14 for raising the forming block L into position while the bail is formed thereon. The forming block is provided with a standard $l'$ which is engaged by the depressing spring $l$ and a short lever $l^2$ pivoted to a bracket $l^3$ depending from plate B, extends from said standard $l'$ to the lever $o^x$ which it engages in such a manner that the cam $p^x$ will raise the forming block above the surface of plate B into operative position when it engages the lever $o^x$. It is obvious that I might employ the cam and lever for depressing the block L and the spring for raising it, if desired but this is my preferred construction as the elevation of the block at the proper time is positively secured.

Figure 1:
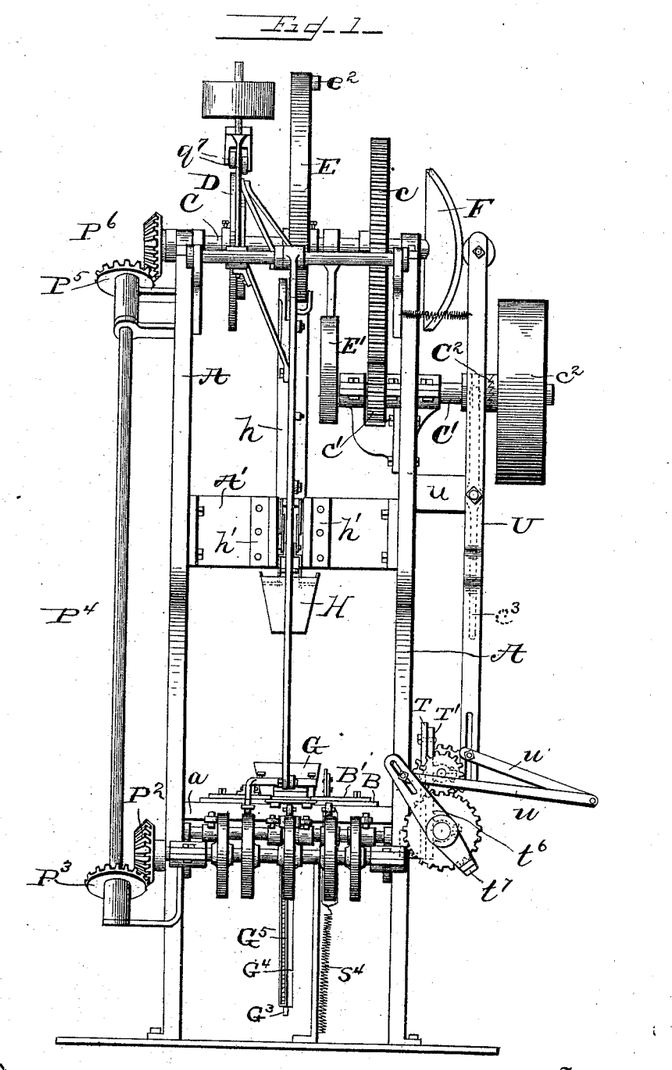
Figure 1 is a front elevation of a machine embodying my invention.

The shaft P is provided at one end with a beveled gear $P^2$ which engages a beveled gear $P^3$ on a vertically disposed shaft $P^4$ which receives motion from the counter shaft C by means of the intermeshing gears $P^5$, $P^6$ as shown in Fig. 1.

The proper movements are imparted to the bail forming slide K from the double cam D on the counter shaft C through the intervention of a series of lever connections. This cam is adjustably secured on the shaft and the lever connections are adjustable so that the proper timing of the parts may be accurately secured so as to insure movements of the desired extent at the proper time and rests of the proper duration.

The cam D and lever connections are best seen in Figs. 1, 2, 3 and 16. A pair of fulcrum shafts Q Q' are mounted adjacent to the extremities of supporting arms $q$ $q$ extending from the standards A A of the frame, and from shaft Q depends an arm $q'$ which is connected by a bar $q^2$ with the slide K the connections being pivotal to allow of the required movements of the parts. From the shaft Q' depends a short actuating arm $q^3$, while an arm $q^4$ extends in a rearward direction and is provided at its outer end with a pair of adjustable friction rolls $q^7$ adapted to engage the double cam D. A brace rod $q^5$ extends from the outer end or arm $q^4$ to the arm $q^3$ and secures the movement of the said latter arm. The arm $q^3$ is slotted as shown in the drawings. A short connection or link $q^6$ connects arm $q^3$ with arm $q'$ and by means of the slots and the connecting bolts the positions of the arms, $q'$ $q^3$ $q^5$ and $q^4$ with respect to the cam D, the slide K and with respect to each other can be adjusted to secure the exact movements of the slide K which are necessary or desirable. The friction rolls are also adjustable by means of slots and bolts as shown clearly in Fig. 16, to further facilitate securing the desired adjustment. In order to hold the friction rolls to the cam grades and secure all the corresponding movements of the lever connections and slide K, I employ a spring or weight (a weight $Q^2$ being shown), which engages the lever arm $q^4$ and holds said rolls upon the grades of the cam. I prefer to employ the double cam shown in the drawings but a single cam might be employed if constructed to produce the desired movements of the slide. The lever arms are suitably braced where necessary to insure the required rigidity of the parts.

Figure 19:
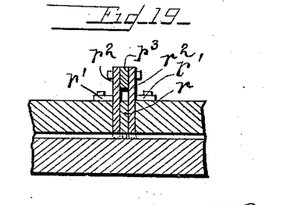
Figs. 19, 20 and 21 are views illustrating the guide for the bail wire, Fig. 19 being a section on line 3—4 and Fig. 20 being a section on line 1—2 of Fig. 21.
Figure 20:
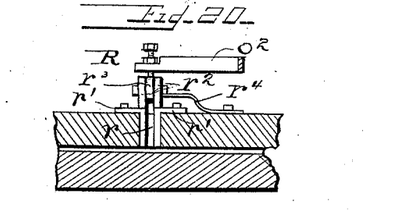
Figure 21:
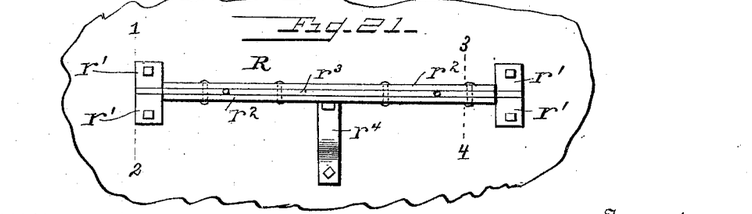

The wire from which the bail is formed is preferably drawn from a spool and is fed into the machine at proper intervals, and severed before it is operated upon by the bail forming devices. The wire passes into the machine between the plates B, B' through a groove $b^x$ cut in the top plate B' (see Fig. 8) and I provide suitable means for holding said wire while it is being severed or cut off and for cutting the same. The wire holding device is clearly shown in Figs. 3, 4, 8, 19, 20 and 21. A slot is made in the top plate B' in line with the groove $b^x$ and a thin plate $r$ of the same thickness as the wire is rigidly secured along the center of this slot, as shown in Figs. 19, 20 and 21, by means of brackets $r'$ $r'$ which are secured to the plate adjacent to its ends, and to the top plate B'. On each side of this plate $r$ are located the vertically movable plates $r^2$ $r^2$ which are separated at their top edge by a back plate $r^3$ of the same thickness as plate $r$, to which they are rigidly bolted, and a space is left between the lower face of back plate $r^3$ and plate $r$ as shown in Fig. 19 to permit of the plates $r^2 r^2$ being depressed. It will be seen that when the plates $r^2$, $r^2$ and $r^3$ are pressed downward, the plates $r^2 r^2$ will pass down on either side of the central rigid plate $r$ until they rest upon the bottom plate, B, thus forming a narrow passage between them for the wire as it enters the machine as clearly shown in Fig. 19. A spring or springs $r^4$ holds the plates $r^2$, $r^2$ and $r^3$ (which taken together I term the wire guide R) above the plate B and flush with the top surface of the recess $b'$ which is formed in plate B' to allow for the movements of the slide K. This wire guide is depressed during the moments when the wire is being fed into the machine, by a forked lever $o^2$ which is fulcrumed in ears on some rigid part of the machine and has its forward end provided with a friction roll engaging the periphery of cam disk $p^2$. This disk is provided with a cam which raises this end of the lever and depresses the wire guide and the forked end of said lever is connected to said guide by means of adjusting screws by means of which the accurate adjustment of the parts is secured.

Figure 15:
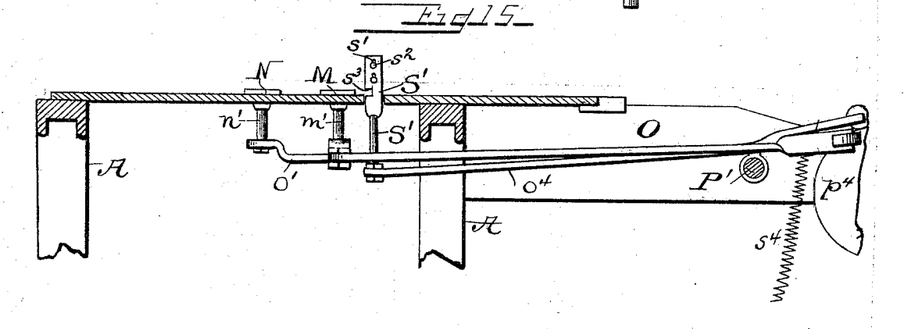
Figures 25, 26:
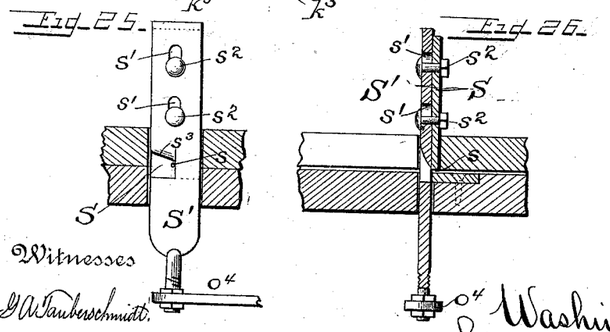
Figs. 25, 26 and 27 are details of the wire cutter or knife.
Figure 27:
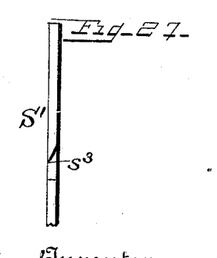

In the path of the wire as it enters the machine is located the wire cutting device shown in detail in Figs. 25, 26 and 27. A vertical standard or support S is secured to the bottom plate and extends upward through the plate B'. This support is provided with an aperture $s$ in line with the groove $b^\times$ and the wire guide, through which the wire passes, as it enters the machine. The knife bar S' is secured to the vertical standard S by means of bolts $s^2 s^3$ which engage slots $s' s'$ in the knife bar and permit the vertical movement of the same. The knife bar is provided with a recess the upper edge of which is formed into a cutting edge $s^3$ as shown. An operating lever $o^4$ (see Figs. 5, 6, 7 and 15) is adjustably connected to the knife bar S' by means of adjusting nuts on said bar and has its forward end provided with a friction roll adapted to be engaged by a cam on the cam disk $p^4$, which at the proper moment raises that end of the lever and depresses the knife bar and severs the wire. This lever is retracted after being operated by its cam, by the spring $s^4$, in this instance secured at one end to the base of the machine frame, see Figs. 1 and 15.

The amount or length of wire fed into the machine depends upon the size of the bail forming devices, and the wire feeding devices are adjusted to feed the exact length of wire for each bail. I prefer however to construct the recessed portion of the top plate B' that a shoulder will be formed as at $x$ Fig. 8 across the path of the incoming wire in order to stop the wire and secure exact uniformity in the length of the bails.

I provide the following mechanism (shown in Figs. 1, 2, 3, 4 and 12) for straightening the wire as it comes from the roll or spool and feeding it into the machine at proper intervals. A bracket T (shown in detail Fig. 12) is secured to one of the standards A A of the frame, and to this bracket is secured the supporting plate T' of the wire feeding mechanism in such a manner that said mechanism may be adjusted vertically and the wire fed straight into the machines. Upon the supporting plate T' is journaled a pair of short shafts $t\ t$ geared to rotate in opposite directions by means of the intermeshing gears $t'$ $t'$. These shafts are provided with grooved feed wheels $t^2 t^2$ which have their point of tangency exactly opposite the groove $b^\times$ in the top plate B'. A bracket arm $t^3$ is secured to the plate T' and extends into the path of the wire where it is provided with an aperture as shown in Fig. 2 exactly in line with the aperture formed by the meeting of the grooved wheels $t^2 t^2$. The wire as it is drawn by said feed wheels is drawn through the aperture in the bracket arm $t^3$ and is straightened before it enters the machine. I may employ some other form of wire straightening device if desired. A pinion $t^4$ is fast on one of the shafts $t\ t$ and the other shaft is provided with a larger loosely mounted pinion $t^5$. Motion is imparted to the pinion $t^5$ at intervals by means of a cam F on the shaft C, and the connecting mechanism.

Figure 3:
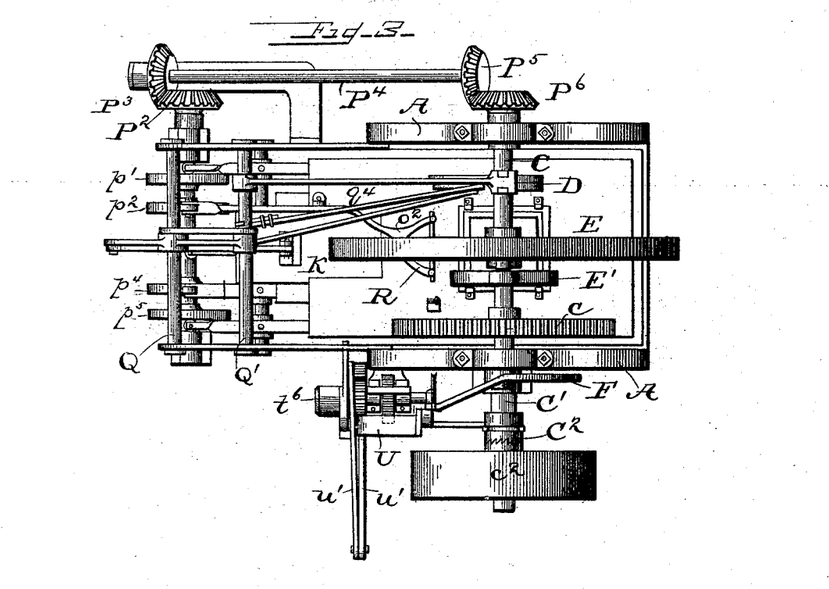
Fig. 3 is a top plan.

The cam F is constructed as shown in Figs. 1, 2 and 3, and is provided with a portion disposed at an angle to the shaft, adapted to impart a lateral movement to a lever U, which is pivotally secured to a bracket $u$ extending outward at an angle from the standard A. The upper end of lever U has a friction roll secured thereto in engagement with the cam F and the lower end of said lever is connected by a link or links $u'$ with a clutch lever $t^6$ which is pivotally mounted on the shaft of gear wheel $t^5$, and has a clutch, adapted to engage said wheel and rotate it when the lever is moved in one direction. Any form of clutch which will give an accurate movement to the wheel $t^5$ may be employed. I have shown in this instance see Figs. 18, 18$^a$ and 18$^b$ a pivoted clutch arm $t^7$ which is pivoted to the lever $t^6$ and has a rectangular recess engaging the wheel $t^5$, a spring $t^8$ bears against the clutch arm and holds it in such position that it will slide along said wheel easily when moved in the direction but when moved in the direction of the arrow in Fig. 18$^a$ the sharp edges of the recess will grip the wheel and cause it to revolve with the lever $t^6$. The lever U and clutch lever $t^6$ are slotted to allow the connecting links $u' u'$ to be adjusted to secure the proper movement of the clutch lever, and consequently the proper feeding of the wire.

The operation of my improved machine is as follows: In case the machine is used merely to attach the bails to the paper vessels formed by the machine described in my former patent hereinbefore referred to, the folded vessel is opened slightly and placed upon the female die G, in position to be engaged by the male die H as it descends, and is forced into the female die and held securely while the bail is being attached, the false bottom of the female die yielding against the force of its retracting spring to permit the male die to be forced down into the female die. If a blank is used it may be previously creased or not as desired and as the male die descends upon the blank it will be forced into the female die and will form the vessel with the co-operation of the beveled inclined portions and the curved guides, which operate as before described, to lead in one set of the side folds before the other set which are folded upon the first in the manner hereinbefore set forth. The wire for the bail is fed in the required length by the wire feeding devices and is cut off by the knife, the wire being held in its place by the wire guide R. As soon as the wire has been cut off, the cam on disk $p^3$ raises the wire guide and the bail forming slide K is moved rearward. At the first movement of the slide K the head of the tongue $k^2$ which is slightly in advance of the other portions of the slide, engages the central portion of the wire and clamps it against the forming block L as shown in Fig. 5. As the slide moves on the tongue $k^2$ will remain stationary, and by reason of its tension devices will exert a strong pressure upon the wire and prevent its buckling while the ends are bent around the forming block. The wire is next engaged by the ends of the arms $k^7$ and bent along the sides of the block L and are clamped between said block and arms. At this point the tongue $k^2$ will be in its innermost position with respect to the other parts of slide K and will move with the slide in its next rearward movement. At this moment the side cams on the disk $p^3$ engage and operate the levers $o^3$ $o^3$ which move the bending slides inward and bend the points of the bail around the rear side of the forming block L as is clearly shown in Fig. 6. At this point the cam on the periphery of disk $p^3$ releases the lever $o^3$ and permits the forming block to be drawn down flush with the surface of the bottom plate by its retracting spring and under the influence of the double cam D, the slide K is moved rearward again pushing the bail through the slot in the female die, until its inwardly turned points are in position to be forced through the central portion of the edges of the paper vessel. The cams on the disks $p'$ $p^5$ at this point engage levers $o'$ $o^5$ and force the punching slides N N inward. These slides engage the ends of the arms $k^7$ of the slide and press them inward forcing the points of the bail through the sides of the paper vessel and along the straight face of the clinching levers $h^{10}$. At this point the cam $e^2$ on the rear face of cam E engages the slide bar H' and actuates the clinching levers, through the intervention of the bell crank levers hereinbefore described, thus bending the points of the bail back and fastening it securely to the paper vessel and at the same time securing the side folds to the side of the said vessel and forming a complete article. The cam D then withdraws the slide K which moves into its original position at the front of the machine. As it moves forward the pin $B^2$ in the plate B' strikes the end of the slot in the tongue $k^2$ and stops its forward movement while the slide moves on, thus drawing out the tongue with respect to the slide and leaving its head in advance of other portions of the slide as before, ready for another operation. As the plunger and male die are raised by the cam E after the bail has been attached, the false bottom $G^2$ of the female die will be forced upward by its spring and will elevate the completed vessel so that it may be easily and quickly removed from the machine and a fresh blank inserted.

The entire operation of forming the vessel and attaching the bail is accomplished during a single revolution of the shaft C of the machine and the shaft P which is geared therewith and a continuously operating machine is thus produced which can be run at a considerable speed, thus completing a paper vessel at each revolution.

I do not wish to be limited to the exact constructions herein described and shown as variations might be made therefrom without departing from the spirit of my invention. For instance a different form of wire feeding and straightening devices could be employed, or the machine could be adapted to form and secure bails to vessels differing slightly from the form herein shown.

What I desire to claim and secure by Letters Patent is—

1. In a machine for making paper vessels, the combination with means for holding a paper vessel of bail forming and applying devices cooperating with said holding means, substantially as described.

2. In a machine for making paper vessels, the combination with the male and female dies, of the bail forming and applying devices cooperating with said male and female dies, substantially as described.

3. In a machine for making paper vessels, the combination with the male and female dies, of wire feeding devices, the cutter, and the bail forming and applying devices cooperating with said male and female dies, substantially as described.

4. In a machine for making paper vessels the combination with the male and female dies, of the wire feeding devices, the cutter, the bail forming devices, and the punching slides, the said female die being provided with slots or recesses permitting the passage of the bail therethrough substantially as described.

5. In a machine for making paper vessels the combination with the male and female dies, of the wire feeding devices, the cutter, the bail forming devices, the punching slides located in line with each other and on opposite sides of the dies and the clinching levers, substantially as described.

6. In a machine for making paper vessels, the combination with the male die, of a female die having slots or recesses therein to receive the bail, the bail forming slide, provided with the tongue movable with respect to said slide, the said tongue being adapted to force said bail through the slots or recesses of the female die, substantially as described.

7. In a machine for making paper vessels the combination with the forming block, of the bail forming slide having the tongue provided with a face adapted to engage the said block, said tongue being capable of movement in respect to said slide and the auxiliary bending slides, substantially as described.

8. In a machine for making paper vessels, the combination with the forming block, the bail forming slide, the tongue carried thereby, and a friction device for resisting the movement of said tongue, and mechanism for advancing said slide, whereby the independent forward movement of the tongue is prevented, substantially as described.

9. In a machine for making paper vessels, the combination with the forming block, the bail forming slide the independently movable tongue, a friction device for said tongue and means for adjusting the pressure of said friction device, substantially as described.

10. In a machine for making paper vessels, the combination with the forming block, the bail forming slide the independently movable tongue, and the laterally movable arms, of the auxiliary bending slides, having portions in line with the rear face of the forming block and adapted to engage portions of the bail extending beyond the extremities of said laterally movable arms, substantially as described.

11. In a machine for forming paper vessels, the combination with the forming block the bail forming slide, provided with laterally movable arms, having portions parallel with portions of the forming block, of the auxiliary bending slides having portions in line with the rear face of the forming block the punching slides, adapted to engage the laterally movable arms and means for moving said forming block, out of the plane of the bail forming slide, substantially as described.

12. In a machine for making paper vessels, the combination with the male die, of a female die provided with slots or recesses permitting the passage of the bail therethrough, of bail forming devices, including laterally movable arms, adapted to form the bail and press it through the said slots or recesses, and punching slides adapted to enter said slots or recesses and engage the said laterally movable arms, substantially as described.

13. In a machine for making paper vessels, the combination with the bail forming slide, of the slotted tongue capable of movement with respect to said slide, and a pin engaging the slot of said tongue and adapted to limit the movement of the same, substantially as described.

14. In a machine for making paper vessels the combination with the forming block, of the bail forming slide and the auxiliary bending slides having portions in line with the rear face of said block, substantially as described.

15. In a machine for making paper vessels, the combination with devices for holding a paper vessel, of the bail forming devices and punching slides arranged in line with each other on opposite sides of the holding devices, substantially as described.

16. In a machine for making paper vessels the combination with the forming block, the bail forming slide, the auxiliary bending slides and the punching slides, substantially as described.

17. In a machine for making paper vessels the combination with the forming block, the bail forming slide the auxiliary bending slides, the punching slides and clinching levers, substantially as described.

18. In a machine for making paper vessels, the combination with the bail forming mechanism, comprising two groups of devices, one group consisting of the forming block and the other group consisting of the devices coacting therewith to form the bail upon the block and to bend portions of the bail back upon the rear face of the forming block, of actuating means combined with one of said groups of devices for moving it out of the plane of the other group, substantially as described.

19. In a machine for making paper vessels, the combination with the bail forming devices including the forming block and the auxiliary bending slides adapted to bend portions of the bail back upon the rear face of said forming block, of means for moving said forming block out of the plane of the other bail forming devices, substantially as described.

20. In a machine for making paper vessels the combination with the forming block, of the bail forming slide, the tongue, the auxiliary bending slides, the punching slides and means for moving said forming block out of the plane of the bail forming devices, substantially as described.

21. In a machine for making paper vessels the combination with the movable forming block, of the bail forming slide and tongue, the auxiliary bending slides, the punching slides, a cam for moving said block out of the plane of the bail forming devices and cams for actuating said slides, substantially as described.

22. In a machine for making paper vessels, the combination with the male and female dies and the bail forming devices including laterally movable arms of punching slides, located in line with each other on opposite sides of the male and female dies, adapted to engage said arms, substantially as described.

23. In a machine for making paper vessels, the combination with the male and female dies, and the bail forming devices including the laterally movable arms of the punching slides located in line with each other on opposite sides of said dies, and the clinching levers adapted to clinch the ends of the bail against the resistance offered by said arms and slides, substantially as described.

24. In a machine for making paper vessels the combination with the female die, and the reciprocating plunger provided with a male die, of a cam actuated rod capable of movement with said plunger and of movement in respect thereto, the clinching levers located on said male die, and connected for operation with said rod, a cam for reciprocating the plunger having a supplemental cam grade for actuating said rod and clinching levers, substantially as described.

25. In a machine for making paper vessels the combination with the reciprocating male die, of the clinching levers located thereon, the bell crank levers, engaging said clinching levers and working in slots in said male die, a cam actuated rod connected with said bell cranks capable of movement with the male die and of movement in respect thereto, and a cam for reciprocating the male die having a grade for operating said rod and clinching levers, substantially as described.

26. In a machine for making paper vessels, the combination with the top and bottom plates, having portions held a space apart equal to the thickness of the wire, of the movable wire guide adapted to pass into said space and engage and guide the wire therein, substantially as described.

27. In a machine for making paper vessels, the combination with the top and bottom plates having a recess between them, of the bail forming devices including the former the wire guide separate from the former for holding the wire in position to be engaged by said bail forming devices, means for feeding wire between said plates and into the wire guide, and means for removing the wire guide from engagement with the wire, substantially as described.

28. In a machine for making paper vessels the combination with the top and bottom plates having portions held a distance apart equal to the thickness of the wire, of the wire guide consisting of a stationary central plate and the side plates movable with respect thereto, and adapted to be moved into said space to engage the wire, substantially as described.

29. A machine for making paper vessels provided with a wire guide consisting of a central stationary plate and movable side plates, and means for moving said side plates into position to engage the wire, substantially as described.

30. In a machine for making paper vessels the combination with the wire feeding devices including a revoluble part, a reciprocating lever, and means for operating the same intermittently, of a clutch lever pivoted to said reciprocating lever and provided with a recess having sharp edges adapted to engage opposite lateral faces of said revoluble part frictionally, when moved in one direction and a spring engaging said clutch lever, substantially as described.

31. A machine for making paper vessels having a male die, and a female die provided on two opposite edges with the guide wire $g^3$, substantially as described.

32. A machine for making paper vessels having a male die and a female die provided on two opposite edges with the inclined beveled portions meeting in a shoulder, and the curved guide wire extending from said shoulder, substantially as described.

33. In a machine for making paper vessels, the combination with the male die and slotted female die adapted to hold a paper vessel, of the bail forming devices cooperating with said dies adapted to form a bail, and pass it into the slot in the female die, and means for securing said bail to said paper vessel located in line with said slot, substantially as described.

34. A machine for making paper pails having means for holding a paper vessel and mechanism for attaching a bail to said vessel operatively combined with said holding means, substantially as described.

In testimony whereof I affix my signature in presence of two witnesses.

WASHINGTON FOGLESONG.

Witnesses:
E. E. BURKHART,
WILLIAM H. RUSSELL.